(12) United States Patent
Whiter

(10) Patent No.: US 8,906,481 B2
(45) Date of Patent: *Dec. 9, 2014

(54) COMPOSITE MATERIALS

(75) Inventor: Mark Whiter, Saffron Walden Essex (GB)

(73) Assignee: Hexcel Composites, Cambridge (GB)

( * ) Notice: Subject to any disclaimer, the term of this patent is extended or adjusted under 35 U.S.C. 154(b) by 741 days.

This patent is subject to a terminal disclaimer.

(21) Appl. No.: 13/123,744

(22) PCT Filed: Oct. 7, 2009

(86) PCT No.: PCT/GB2009/051329
§ 371 (c)(1),
(2), (4) Date: Apr. 12, 2011

(87) PCT Pub. No.: WO2010/046682
PCT Pub. Date: Apr. 29, 2010

(65) Prior Publication Data
US 2011/0194942 A1    Aug. 11, 2011

Related U.S. Application Data

(63) Continuation-in-part of application No. 12/307,591, filed as application No. PCT/GB2007/002599 on Jul. 11, 2007.

(30) Foreign Application Priority Data
Oct. 20, 2008    (GB) .................................. 0819186.8

(51) Int. Cl.
*B32B 27/00* (2006.01)
*D03D 33/00* (2006.01)
*B32B 27/02* (2006.01)
*B32B 5/26* (2006.01)

(52) U.S. Cl.
USPC ............ 428/86; 428/131; 428/141; 428/219; 428/220; 428/406; 442/327; 442/381; 264/257; 264/258

(58) Field of Classification Search
None
See application file for complete search history.

(56) References Cited

U.S. PATENT DOCUMENTS

| 6,042,936 A | 3/2000 | Kempf | |
|---|---|---|---|
| 2002/0079052 A1 | 6/2002 | Zhou | |
| 2002/0136862 A1* | 9/2002 | Dong et al. | 428/150 |
| 2011/0194942 A1* | 8/2011 | Whiter | 416/229 R |

FOREIGN PATENT DOCUMENTS

| WO | 2008/007094 | 1/2008 |
|---|---|---|
| WO | 2008/056123 | 5/2008 |

* cited by examiner

*Primary Examiner* — Lynda Salvatore
(74) *Attorney, Agent, or Firm* — W. Mark Bielawski; David J. Oldenkamp

(57) ABSTRACT

A prepreg assembly comprising resin and fibers and comprising an uppermost curable resin surface layer such that when the assembly is cured, the uppermost surface layer has a sandability of at least 0.30 mg/cycle over 200 cycles, as measured according to ASTM D4060 using a Taber 5151 Abrasion Tester fitted with H18 wheels and a 1.0 kg weight is provided.

19 Claims, 2 Drawing Sheets

COMPOSITE MATERIALS

This application is a continuation-in-part of copending U.S. patent application Ser. No. 12/307,591, which was filed on Mar. 9, 2009 and which is a 371 of PCT/GB07/02599, which was filed on Jul. 11, 2007.

TECHNICAL FIELD

The invention relates to prepreg assemblies comprising resin and fibres having a surface finishing treatment and to the cured composite material.

BACKGROUND

Composite materials have well-documented advantages over traditional construction materials, particularly in providing excellent mechanical properties at very low material densities. As a result, the use of such materials is becoming increasingly widespread and their application ranges from "industrial" and "sports and leisure" to high performance aerospace components.

Prepregs, comprising a fibre arrangement impregnated with resin such as epoxy resin, are widely used in the generation of such composite materials. Typically a number of plies of such prepregs are "laid-up" as desired and the resulting assembly, or laminate, is placed in a mould and cured, typically by exposure to elevated temperatures, to produce a cured composite laminate.

However, without any surface treatments applied, such composite materials often have a rough, or pinholed, surface. This tendency to form an uneven surface appears to be closely linked to the coarseness of the underlying fibres, the problem being more pronounced the coarser the fibres are. This can be a particular problem when coarse fibres are routinely used and yet a smooth surface finish is highly desirable, one example being in the construction of windblades.

A known technique for providing a smooth surface finish to such composites is to use a so-called gel coat. Briefly, this involves pasting a flowable composition on the internal surface of the mould which is then cured to form a gel layer, the prepreg assembly being placed onto the gel layer prior to curing. During cure, the prepreg and gel coat fuse together, this generally resulting in a smooth glossy surface to the formed composite. However, the process is very labour intensive requiring an initial curing step and tends to produce a gel layer of uneven thickness. Furthermore, the layer needs to be relatively thick (e.g. on average 0.3 mm) to cover up the defects, having an undesirable weight increase.

In view of the disadvantages of applying a gel coat, an alternative solution proposed involves incorporating a so-called surface finishing film into the prepreg assembly. WO 2008/007094 discloses such a finishing film, involving a surface prepregged microfibre sheet with an underlying fleece of glass fibre, also prepregged. On curing, the finishing films prevent the formation of the pinholes and provide a smooth surface without requiring a gel coat.

It would therefore appear that the problem of providing a good surface finish, even to coarse fibre composites, had largely been solved. However, hitherto unforeseen problems have now been found to arise in practice.

SUMMARY OF THE INVENTION

Once a structure, e.g. a windblade, has been assembled from cured composite laminates, it is almost always the case that the end user will desire the structure to be painted. Whether it is merely to alter its colour or to introduce other physical properties such as weather proofing. It is common established practice to prepare the surface of the structure by abrading it, e.g. by sanding. This not only removes any contaminants on the surface but also allows the paint to "key-in" to the micro roughness produced, giving better paint adhesion and increasing the service life of the structure.

It has now been found that end users sand laminates comprising a surface finishing film to such an extent that they damage its structure and produce the very same pinholes in the surface the finishing film was intended to prevent.

The present inventors have identified that when sanding, end users look for a change in the level of surface gloss as an indication of sufficient sanding. It appears that the surfaces produced by use of a finishing film as discussed above are more resistant to sanding than they are used to and as a result they tend to use a more aggressive sanding regime, resulting in the above-mentioned damage occurring.

Thus, in a first aspect, the invention relates to a prepreg assembly comprising thermosetting resin and fibres and comprising an uppermost curable resin surface layer, such that when the assembly is cured, the uppermost surface layer has a sandability of at least 0.30 mg/cycle over 200 cycles as measured according to ASTM D4060 using a Taber 5151 Abrasion Tester fitted with H18 wheels and a 1.0 kg weight.

By designing the uppermost layer to respond well to being sanded, a change in gloss level is observed before any damage to underlying fibres can occur, allowing sanding to cease, and providing a clean smooth finish but which has a sanded micro roughness allowing a paint layer to be applied to give an attractive and long service life.

It has been found that a sandability of from 0.3 to 2.0 mg/cycle, preferably from 0.4 to 1.0 mg/cycle, is preferred.

The sandability may be achieved in a number of ways, e.g. by designing the uppermost layer to be soft. However, it has been found that this sandability is preferably achieved by including particulate granular material in the uppermost layer, e.g. at least 10 wt %.

Thus, in a second aspect, the invention relates to a prepreg assembly comprising thermosetting resin and fibres and comprising an uppermost curable resin surface layer which layer comprises at least 10 wt % of particulate granular material.

Preferably the surface layer comprises from 15 to 40 wt % particulate granular material, more preferably from 20 to 30 wt %.

The particulate granular material preferably has a mean particle size of from 5 to 50 microns, preferably from 10 to 30 microns.

The thickness of the uppermost layer must be such that it can safely be sanded without fear of damaging the fibres beneath whilst also not being so thick that the weight increase in the prepreg becomes significant. Therefore, preferably the uppermost layer has a mean thickness of from 10 to 200 microns, preferably from 20 to 100 microns.

The particulate granular material may be any suitable material, typically made from an inert material, or "filler". A preferred material is made from glass spheres, with a particle size of from 5 to 50 microns, preferably from 25 to 35 microns and a particle density of 2.5 g/cm$^3$.

In a preferred embodiment, the uppermost layer is coloured, e.g. by comprising a dye or pigment. By colouring the uppermost layer the end user has a second visual indication, in addition to a change in gloss, signalling when sufficient sanding has taken place.

It is preferred that the uppermost layer is translucent so that the colour of the layers immediately below can be seen through the uppermost layer when it is sufficiently thin. For example an uppermost translucent blue layer with a paler coloured layer immediately below will show a gradual colour change from blue to a paler shade of blue as the uppermost layer is sanded by the end user.

Thus, the colour change can signal to the end user to stop sanding before all of the uppermost layer is sanded away.

Whilst the present invention is of general applicability, preferably the prepreg of the present invention comprises surface finishing fibres, as disclosed in WO 2008/007094 discussed above. Thus, preferably the prepreg assembly comprises a fibrous veil layer to help provide a smooth surface finish, preferably having an areal weight of from 5 to 20 gsm, more preferably from 7 to 15 gsm. If present the fibrous veil is preferably immediately below the uppermost layer.

Suitable materials for the veil layer include polyester, polyamide, aramid, acrylics and any combination thereof.

Preferably the fibrous veil is supported by a non-woven fleece layer beneath it, for example a glass fibre fleece as disclosed in WO 2008/007094. Such a fleece may be heavier duty than the veil with an areal weight of from 30 to 70 gsm.

The prepreg assembly may comprise resin in a variety of types and forms. For example resin may be present as discrete layers between fibre sheets, including the fleece and veil layers if present. Typically however resin is prepregged into the structure of the fibre layers, although some fibre layers could potentially be left "dry" as desired in a so-called semi-preg arrangement. Resin may be present in patterns or as layers, the choice of design being at the discretion of the person skilled in the art.

Typically, the uppermost curable resin layer comprises a thermoset resin as conventionally employed in prepreg manufacture, such as resins of phenol formaldehyde, urea-formaldehyde, 1,3,5-triazine-2,4,6-triamine (Melamine), bismaleimide, epoxy resins, vinyl ester resins, benzoxazine resins, phenolic resins, polyesters, unsaturated polyesters, cyanate ester resins, or mixtures thereof. Epoxy resins are preferred. Curing agents and optionally accelerators may be included as desired.

The prepreg assembly typically comprises at least one layer of fibres in sheet form.

The prepreg assembly preferably comprises layers of resin and fibres in order to provide mechanical strength to the cured laminate. The type and design of such structural resin and fibres may be any known to the person skilled in the art, for example those mentioned in WO 2008/056123.

Typically the fibres in the layer of fibres will extend across the entire prepreg assembly, e.g. in a unidirectional or woven manner.

In a preferred embodiment, the resin in the uppermost layer has a greater viscosity than the resin beneath the uppermost layer. This helps to prevent the migration of resin from the uppermost region down into the prepreg assembly during storage and curing. The viscosity of resin in the uppermost layer is preferably at least twice that immediately beneath it.

The present invention may be applied to prepregs for use in a wide variety of applications. However, it has been found to be of particular relevance to the production of windblades such as those used in a wind-energy farm. In such applications typically the structural fibres are relatively coarse and comprise at least one structural fibre sheet, e.g. glass fibre, with an areal weight of from 600 to 1200 gsm.

The prepreg assembly of the present invention is preferably manufactured by laying down the uppermost layer onto a mold surface, followed by laying down successive layers, followed by curing the assembly by exposing it to elevated temperature, and optionally elevated pressure.

Thus the prepreg assembly is cured by the uppermost layer being in contact with a mold surface. Typically subsequent layers are laid down on top of the uppermost layer to produce a sandwich-like structure. In a preferred embodiment, the prepreg assembly comprises at least three layers, more preferably at least four layers.

The prepreg assembly may be cured by any suitable known method, such as vacuum bag, or autoclave cure or press cure. However, the vacuum bag method is preferred as this is the preferred method for windblades.

The invention will now be illustrated by way of example, with reference to the following figures, in which:—

Figure 1:
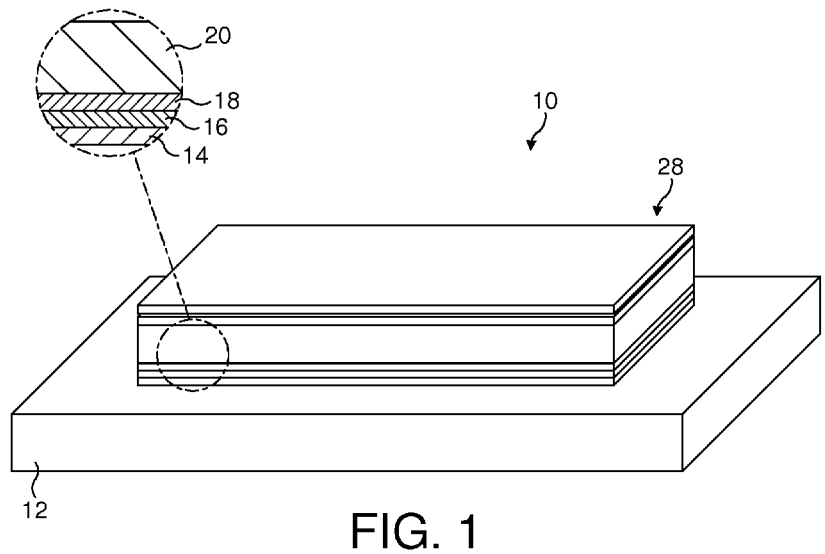
FIG. 1 is a representation of a prepreg assembly in contact with a mould surface.
Figure 2:
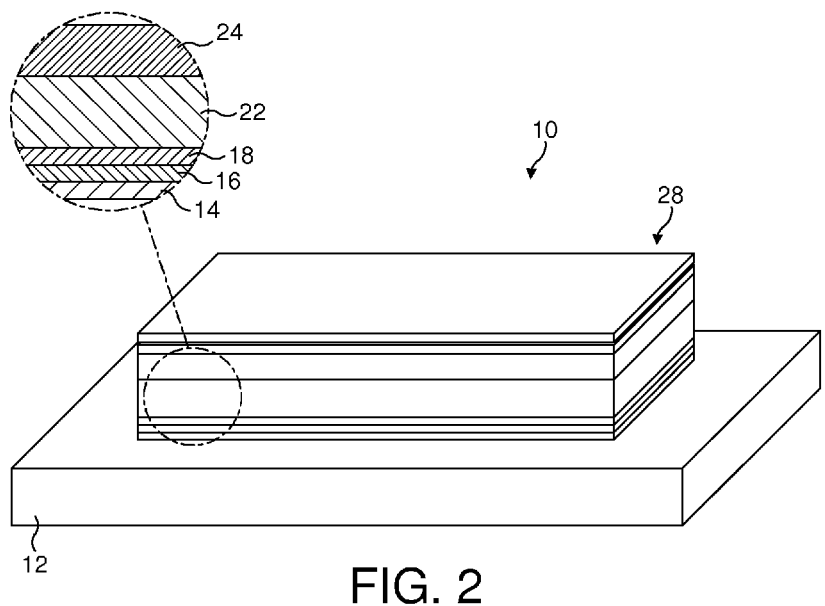
FIG. 2 is a representation of another prepreg assembly in contact with a mould surface.
Figure 3:
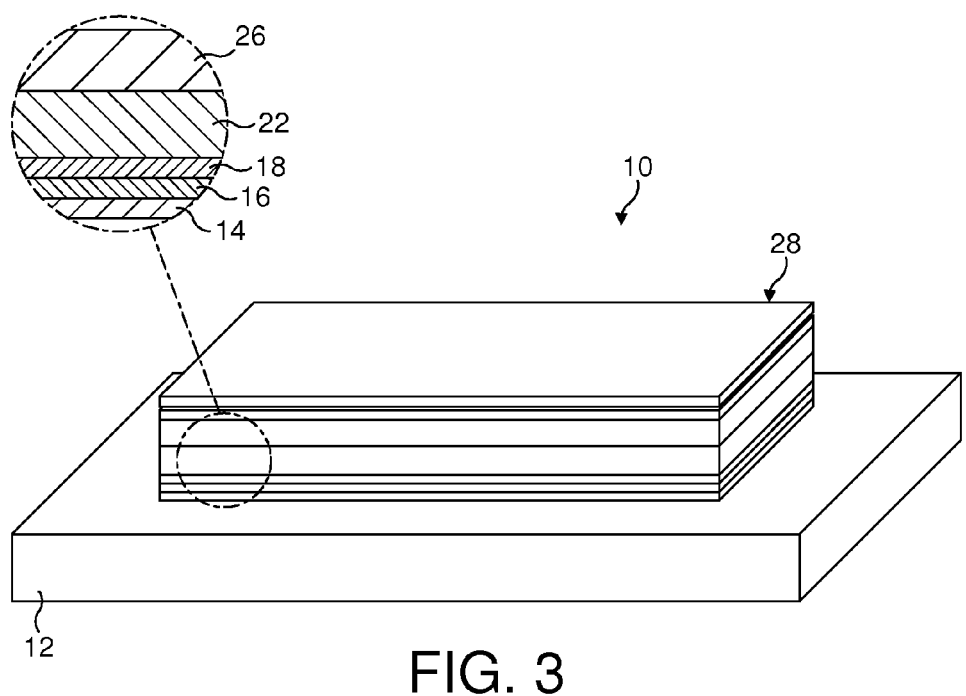
FIG. 3 is a representation of a further prepreg assembly in contact with a mould surface.

Turning to the figures, FIGS. 1 to 3 show a prepreg assembly 10 in contact with a to mould surface 12. The prepreg 10 is arranged such that its uppermost surface is in contact with the mould and is thus shown upside down.

The uppermost layers are shown in greater detail and show an uppermost resin surface layer 14 comprising:
- 70.1% of a modified bisphenol A epoxy resin
- 2.0% of dicyandiamide
- 1.0% of N,N"-(4-methyl-1,3-phenylene)bis[N'N'-dimethyl-Urea]
- 2.4% of hydrophobic treated fumed silica
- 24.4% of micro glass spheres having an average particle size of about 30 microns
- 0.1% of blue pigment dispersion in bisphenol A epoxy resin the next layer being a fibrous veil layer 16 which may, for example, be an 11 gsm veil of Wramp™ made from a blend of 65% polyester and 35% nylon (available from Technical Fibre Products, Kendal, UK), the next layer being a 30 gsm non-woven fleece layer 18.

The following layers are the so-called structural layers and in FIG. 1 is shown to be prepregged glass fibre layer 20 comprising LBB 1200 glass fibre fully impregnated with M9.6 resin (both available from Hexcel). FIG. 2 shows a dry glass fibre layer 22 comprising LBB 1200 glass fibre, with a separate layer of resin 24, comprising M9.6, in a so-called semipreg arrangement. FIG. 3 shows a dry glass fibre layer 22 comprising LBB 1200 glass fibre, with a separate layer of prepregged fibre 26, comprising LBB 1200 prepregged with M9.6 resin.

Finally the prepreg assembly is further supported by additional layers of prepregged fibre 28.

EXAMPLES

Test Equipment and Methods

To measure abrasion, cured laminates were tested according to ASTM D4060 using a Taber 5151 Abrasion Tester fitted with H18 wheels and a 1 kg weight. Sample weight loss (a measure of abrasion wear) was measured periodically up to 500 wear cycles.

To measure gloss, the laminates were periodically measured according to EN ISO 2813 using a handheld gloss meter at 85° (Sheen Instruments Ltd, Tri-Glossmaster) over the sample area which had been subjected to abrasion.

To measure colour, the laminates were periodically measured using a handheld spectrophotometer (X-Rite SP60) using a D65 standard illuminant and 10° standard observer specular component excluded and L*a*b* colour space over the sample area which had been subjected to abrasion.

Production and Testing

Prepreg assemblies shown in FIG. 1 were manufactured according to the following procedure.

To produce the uppermost resin layer, the bisphenol A resin was heated to 70° C. in a suitable container. Each additional material was charged to the container and mixed using a DAC 400FVZ Speedmixer. The formulated material was then filmed on to siliconised paper using a reverse-roll Dixon coater at 50 gsm and 100 gsm.

The prepreg is manufactured on a dedicated production line. The fibrous veil is attached using the inherent tack of the resin and the intermediate fleece can be attached to the reinforcement fabric either by stitching, thermally bonding or by using the inherent tack of the resins used. The uppermost resin layer is either heat transferred from the siliconised paper to the microfibre veil side of the surface finishing assembly or it can be coated directly to a preferred weight on to the microfibre fleece side.

A mould (usually of a composite construction) is pre-treated with a suitable release agent (e.g. Zyvax Watershield) prior to lay up of the invention material and additional laminating layers. The assembly is then sealed inside a vacuum bag, the air is evacuated and a vacuum is applied, and cured in a suitable oven. Typical cure schedule is 25-80° C. at 1° C./min, 120 minutes at 80° C., 80-120° at 1° C./min, 60 minutes at 120° C.

After cure the laminate is cut in to 100×100 mm specimens and bonded to an aluminium plate of the same size so that the surface finishing side is exposed. Redux 810 paste adhesive (Hexcel, Duxford, UK) is used to bond the plate to the specimen and cured for 60 minutes at 60° C. A 6.5 mm hole is drilled through the centre of each specimen in order for it to be mounted to the Taber abrasion tester.

The Taber test is periodically stopped, the number of abrasion cycles recorded and the samples removed to measure weight loss, gloss and colour. The samples are then remounted and the test is recommenced.

Results

The following Table 1 compares the abrasion weight loss of a surface finishing film composite as described in WO 2008/007094 and a cured composite laminate according to the present invention. The higher abrasion weight loss the greater the response to sanding.

TABLE 1

| Abrasion cycles | Control - surface finishing film composite Abrasion weight loss (g) | Surface finishing composite with present invention Abrasion weight loss (g) |
| --- | --- | --- |
| 0 | 0 | 0 |
| 20 | 0.0049 | 0.0035 |
| 40 | 0.0106 | 0.0135 |
| 60 | 0.0159 | 0.0269 |
| 80 | 0.0206 | 0.0451 |
| 100 | 0.0256 | 0.0622 |
| 200 | 0.0441 | 0.1193 |
| 300 | 0.0547 | 0.1579 |
| 400 | 0.086 | 0.1980 |
| 500 | 0.1143 | 0.2548 |

The following table 2 shows how the invention demonstrates to the end user a clear end point when sanding to avoid over sanding and damaging the surface.

TABLE 2

| | Surface finishing composite with present invention | |
| --- | --- | --- |
| Abrasion cycles | Gloss (G.U.s) | Colour change (ΔE) |
| 0 | 24.53 | 0 |
| 20 | 12.01 | 3.85 |
| 40 | 7.54 | 4.34 |
| 60 | 4.63 | 6.54 |
| 80 | 2.31 | 6.98 |
| 100 | 2.47 | 7.81 |
| 200 | 2.53 | 9.78 |
| 300 | 3.38 | 11.10 |
| 400 | 3.27 | 11.46 |
| 500 | 2.68 | 12.51 |

The invention claimed is:

1. A prepreg assembly having a surface and comprising:
   a) a surface enhancing layer located at the surface of said prepreg assembly, said surface enhancing layer comprising a veil of fibers, said veil of fibers having an areal weight of from 5 to 20 grams per square meter;
   b) at least one reinforcing fiber layer comprising a structural fiber sheet comprising a fibrous reinforcement and an uncured thermosetting resin matrix;
   c) a fleece layer located between said surface enhancing layer and said structural layer, said fleece layer comprising fibers wherein the fiber areal weight of said fleece layer is from 30 to 70 grams per square meter;
   f) an uppermost surface layer comprising a curable thermosetting surface resin and glass spheres having a mean particle size of from 5 to 50 micrometers, said uppermost surface layer being located on top of said surface enhancing layer and forming the surface of said prepreg assembly wherein, when the assembly is cured, the uppermost surface layer has a sandability of at least 0.30 mg/cycle over 200 cycles, as measured according to ASTM D4060 using a Taber 5151 Abrasion Tester fitted with H18 wheels and a 1.0 kg weight.

2. A prepreg assembly according to claim 1, wherein the uppermost surface layer has a mean thickness of from 10 to 200 microns.

3. A prepreg assembly according claim 1, wherein the uppermost surface layer contrasts in color with the surface of said prepreg assembly located immediately below said uppermost surface layer.

4. A prepreg assembly according to claim 1, wherein the uppermost surface layer is translucent.

5. A prepreg assembly according to claim 1, wherein the viscosity of the curable thermosetting surface resin in the uppermost surface layer is greater than the viscosity of any thermosetting resin located immediately beneath said uppermost surface layer.

6. A prepreg assembly according to claim 1, wherein the uppermost surface layer is in contact with a mold surface.

7. A composite laminate formed by curing a prepreg assembly according to claim 1.

8. A windblade component comprising at least one composite laminate according to claim 7.

9. A prepreg assembly according to claim 1 which further comprises an uncured thermosetting resin located between said fiber reinforcing layer and said fleece layer.

10. A prepreg assembly according to claim 9 wherein said uncured thermosetting resin that is located between said fiber reinforcing layer and said fleece layer is in the form of a resin layer that is free of fibers.

11. A prepreg assembly according to claim 10 which comprises a layer of dry fibers located between said layer of uncured thermosetting resin and said fleece layer.

12. A prepreg assembly according to claim 9 wherein said uncured thermosetting resin that is located between said fiber reinforcing layer and said fleece layer is impregnated into a fibrous support.

13. A prepreg assembly according to claim 12 which comprises a layer of dry fibers located between said layer of uncured thermosetting resin and said fleece layer.

14. A prepreg assembly according to claim 1 which further comprises a fibrous layer impregnated with uncured thermosetting resin located between said fleece layer and said reinforcing fiber layer.

15. A prepreg assembly according to claim 1 wherein said curable thermosetting surface resin comprises an epoxy resin.

16. A prepreg assembly according to claim 1 wherein said fibrous reinforcement has an areal weight of from 600 to 1200 gsm.

17. A prepreg assembly according to claim 1 wherein said glass spheres have a particle size of from 25 to 35 microns.

18. A prepreg assembly according to claim 1 wherein the amount of glass spheres in said uppermost surface layer is from 15 to 45% based on the weight of said uppermost surface layer.

19. A prepreg assembly according to claim 1 wherein the mean thickness of said uppermost surface layer is from 20 to 100 microns.

* * * * *